3,388,192
3-(FLUOROMETHYL)-3-BUTEN-1-OL PYROPHOSPHATE AND PROCESS FOR MAKING SAME
Hans Machleidt, Biberach an der Riss, Horst Lechner, Oberlar, Troisdorf, and Michael Klockow, Marbach, near Marburg, Germany, assignors, by mesne assignments, to E. R. Squibb & Sons, Inc., New York, N.Y., a corporation of Delaware
No Drawing. Filed Apr. 13, 1965, Ser. No. 447,900
2 Claims. (Cl. 260—933)

ABSTRACT OF THE DISCLOSURE 3-(fluoromethyl)-3-buten-1-ol pyrophosphate, which inhibits the biosynthesis of squalene and of cholesterol, and to the method for producing it from 3-fluoromethyl-3-butene-1-ol phosphoric acid morpholide by reaction with phosphoric acid.

---

This invention relates to the compound 3-(fluoromethyl)-3-buten-1-ol pyrophosphate. 3-(fluoromethyl)-3-buten-1-ol pyrophosphate inhibits the biosynthesis of squalene which is a precursor of cholesterol. It is therefor useful as a hypocholesteremic agent which is administered orally or parenterally to inhibit the biosynthesis of squalene and of cholesterol thereby regulating the level of cholesterol in cases of atherosclerosis or similar conditions involving excessive cholesterol levels in animal species. The compound is made up for administration at a level of about 0.02 to 5 mg./kg./day, preferably 0.1 to 1 mg./kg./day, in single or two to three divided doses. These may be in dosage forms such as tablets, capsules, elixirs, aqueous solutions or other injectables incorporating 0.5 to 100 mg., preferably 2.5 to 25 mg., of the active material together with conventional vehicles, excipients, binding agents, lubricants, preservatives, etc., as required according to accepted practice.

3-(fluoromethyl)-3-buten-1-ol pyrophosphate is synthesized as follows:

Example 1

26 g. (0.63 mole) of lithium aluminum hydride is suspended in 1.5 l. of absolute ether and cooled to 0° C. by means of an ice-salt mixture. Then a solution of 100 gms. (0.61 mole) of 3-hydroxy-3-fluoromethyl butyric acid ethyl ester in 300 ml. of ether is added dropwise at 0° C. over a period of 5 hours with rapid stirring. The mixture is then permitted to slowly warm to room temperature with continuous stirring. The mixture is again cooled and excess lithium aluminum hydride is decomposed by the addition of 24 ml. of ethyl acetate and 170 ml. of saturated ammonium chloride solution and the lithium aluminum hydride hydrate is separated by filtration. The reaction mixture is dissolved in 2 N sulfuric acid with cooling and continuously extracted with ether for 10 hours. The ether phases are combined and dried with magnesium sulfate. Distillation yields 59 g. of 3-(fluoromethyl)-butane-1,3-diol, B.P. 55–56° C.$_{0.005\ mm.}$ To a solution of 58 g. (0.48 mole) of 3-(fluoromethyl)-butane-1,3-diol in 150 ml. of absolute pyridine are added dropwise 54 gms. (0.53 mole) of acetic anhydride at 0° over a period of 4 hours with rapid stirring. The reaction mixture is then permitted to slowly warm to room temperature overnight. The pyridine and acetic anhydride are removed under water vacuum with a water bath temperature of 40–50° C. 69 gms. of 3-(fluoromethyl)-butane-1,3-diol-1-acetate, B.P. 108° C.$_{11\ mm.}$ are obtained in pure form by slow distillation in a 25 cm. Vigreux column.

70.3 gms. (0.58 mole) of thionyl chloride (distilled over olive oil) is added dropwise to 200 ml. of absolute pyridine at −15° with rapid stirring. Then 80.3 gms. (0.49 mole) of 3-(fluoromethyl)butane-1,3-diol-1-acetate are added dropwise over a period of 3 hours at −15° to the pyridine solution. The originally colorless solution begins to turn yellow with the first drops of acetate, the color becomes deeper and then a light brown, crystalline material precipitates. After completing the addition of the acetate, the mixture is stirred for an additional 4 hours at −15°. The mixture is permitted to slowly warm to room temperature. Then after warming at 40° C. for two hours, the red-brown reaction mixture is added to 250 ml. of an ice-water mixture. The dark aqueous solution is extracted five times with 150 ml. portions of ether. After drying briefly over magnesium sulfate the ether and pyridine are removed by filtration under water vacuum. To remove the remaining traces of pyridine the residue is taken up in ether, shaken with excess 2 N sulfuric acid and washed neutral with sodium bicarbonate solution and water. After drying over magnesium sulfate and removing the ether, the gas chromatogram shows 5 distinct peaks.

The five dehydration products are separated by preparative gas chromatography at 95–125° with hydrogen as the carrier gas and polyethylene glycol adipinate as the stationary phase, 15% on Chromosorb W 60/80 in a 5-meter column with a diameter of 20 mm. Fraction 2 contains the desired 3-fluoromethyl-3-butene-1-ol acetate which is taken up in ether, dried with alumina and distilled, B.P. 57°$_{8\ mm.}$ 5 gms. (0.048 mole) of 3-fluoromethyl-3-butene-1-ol acetate, 250 ml. (0.027 mole) of aqueous saturated barium hydroxide solution and 5 ml. of ethyl alcohol are boiled for 5 minutes. Then after cooling with ice water, excess base is removed with carbon dioxide gas. The precipitate and the aqueous solution are slowly and continuously extracted with ether for five hours. After drying the ether solution with magnesium sulfate, 2.6 gms. of 3-fluoromethyl-3-butene-1-ol, B.P. 66° C.$_{16\ mm.}$ are obtained.

32.2 gms. (0.1 mole) of β-cyanoethyl phosphate are dissolved in 250 ml. of water with the addition of 75 ml. of Dowex 50 H resin. After filtering the solution over an additional 55 ml. of Dowex 50 H resin and the addition of 40 ml. of pyridine, the mixture is evaporated to dryness and the residue, a colorless, viscous oil, is evaporated with 3× 1 ml. of absolute pyridine and 2× 1 ml. of absolute benzene to remove water as completely as possible. The residue is then taken up in 100 ml. of absolute pyridine to provide a stock β-cyano ethyl phosphate phosphorylation solution.

1.5 gms. (14.5 mmoles) of 3-fluoromethyl-3-butene-1-ol, 30 ml. (30 mmoles) of β-cyanoethyl phosphate phosphorylation solution and 10.8 gms. (75 mmoles) of trichloroacetonitrile in 30 ml. of absolute pyridine are heated at 75° C. for four hours with stirring. After distilling off the solvents under water vacuum, a brownish viscous oil remains. This is treated with 50 ml. water. Trichloroacetamide comes out as a brownish crystalline slurry. After filtration and several washings of the crystals with water, the aqueous solution is concentrated under vacuum to about 10 ml. Then additional crystals precipitate out which, after standing overnight at a low temperature, are filtered off. The clear filtrate is treated with 400 ml. of aqueous saturated barium hydroxide solution and boiled for 5 minutes. A fine crystalline precipitate of barium phosphate comes out which is separated by filtering the hot solution. A colorless, strongly basic filtrate is concentrated to about 100 ml. and practically all barium ions are precipitated out by titration with 2 N sulfuric acid. Chloride ions are removed by shaking with 0.5 gm. of silver oxide. Any remaining barium ions as well as silver ions are removed from the chloride free filtrate by filtration over 50 ml. of Dowex 50 H after the addition of about 1 ml. of cyclohexylamine. The material is concentrated to dryness under vacuum in a centrifugal evaporator. The light yellow residue is dissolved in 10 ml. of water and upon the careful addition of acetone 3-fluoromethyl-3-butene-1-ol phosphate is obtained in the form of the bis-cyclohexyl ammonium salt, M.P. 165–171° C.

2 gms. (4.8 mmoles) of 3-fluoromethyl-3-butene-1-ol-phosphate are dissolved in 20 ml. of water and by filtering over 7 ml. of Dowex 50 H is converted into the free acid. After the addition of about 2 ml. of morpholine the eluate is evaporated to dryness. The colorless viscous residue is taken up in 75 ml. of t-butanol, treated with 2.2 gms. (25 mmoles) of morpholine and 5.2 gms. (25 mmoles) of dicyclohexylcarbodiimide, then heated to boiling for 4 hours. After evaporating the solvent and adding water, dicyclohexyl urea precipitates out. After standing overnight the mixture is filtered, washed several times with water and brought to dryness in the centrifugal evaporator. After evaporating with 5× 20 ml. of absolute benzene, the residual viscous syrupy 3-fluoromethyl-3-butene-1-ol-phosphoric acid morpholide is dissolved in 25 ml. of absolute pyridine.

To 25 ml. of absolute pyridine are added 2.3 gms. (15 mmoles) of tri-n-butylamine and 1.5 gms. (1.15 mmoles) of crystalline phosphoric acid and a solution is formed after stirring for one-half hour. The above obtained morpholide solution is then added and the reaction mixture is permitted to stand at room temperature for four days. The solvent is removed by centrifugal evaporation under vacuum and the residue is digested with 150 ml. of isopropanol/ammonia/water (6:2:1). After standing for one hour the precipitated inorganic phosphate is filtered off and washed with 5× 10 ml. isopropanol/ammonia/water. The product is then evaporated to dryness, washed with water and shaken with ether to separate the tri-n-butylamine. After concentrating slightly, the aqueous solution is filtered over 50 ml. of Dowex 50H. To the thus obtained pyrophosphoric acid monoester is added excess cyclohexylamine and evaporated to dryness. The colorless residue is dissolved in 4 ml. of water and the product, 3-fluoromethyl-3-butene-1-ol pyrophosphate is precipitated as the tris-cyclohexylammonium salt by the careful addition of acetone. After first being obtained as an amorphous precipitate, a colorless crystalline product forms, M.P. 159–164° C.

Example 2

1000 tablets, each containing 2.5 mg. of active material are produced from the following ingredients:

| | G. |
|---|---|
| 3-(fluoromethyl)-3-buten-1-ol pyrophosphate | 2.5 |
| Lactose | 173.0 |
| PVP | 3.8 |
| Magnesium stearate | 0.95 |
| Starch qs | 190.0 |

The pyrophosphate and lactose are granulated with a 10% solution of the polyvinyl pyrrolidone in alcohol. The granulate is dried at 40° C. When dry, it is comminuted to about 16 mesh size.

The dried and comminuted material is well blended with the magnesium stearate and starch, then compressed into tablets each weighing 190 mg.

Example 3

1000 capsules, each containing 25 mg. of active material, are produced from the following ingredients:

| | G. |
|---|---|
| 3-(fluoromethyl)-3-buten-1-ol pyrophosphate | 25.0 |
| Lactose | 222.75 |
| Magnesium stearate | 2.25 |

All three ingredients are pulverized and blended well, then filled into No. 2, two piece gelatin capsules, each containing 250 mg.

What is claimed is:
1. 3-fluoromethyl-3-butene-1-ol pyrophosphate.
2. A process for the production of 3-fluoromethyl-3-butene-1-ol pyrophosphate which comprises reacting 3-fluoromethyl-3-butene-1-ol-phosphoric acid morpholide with phosphoric acid.

References Cited
FOREIGN PATENTS
782,267   9/1957   Great Britain.

CHARLES B. PARKER, *Primary Examiner.*

JOSEPH P. BRUST, *Examiner.*

A. H. SUTTO, *Assistant Examiner.*